Dec. 29, 1925. 1,567,733
B. M. W. HANSON
THREAD FORMING TOOL
Filed June 23, 1920
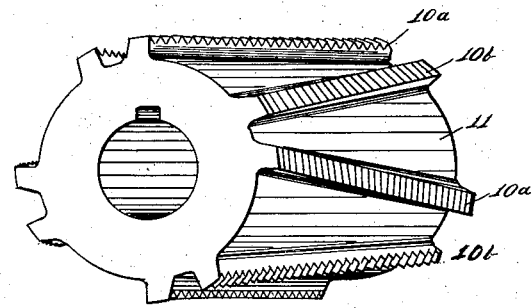
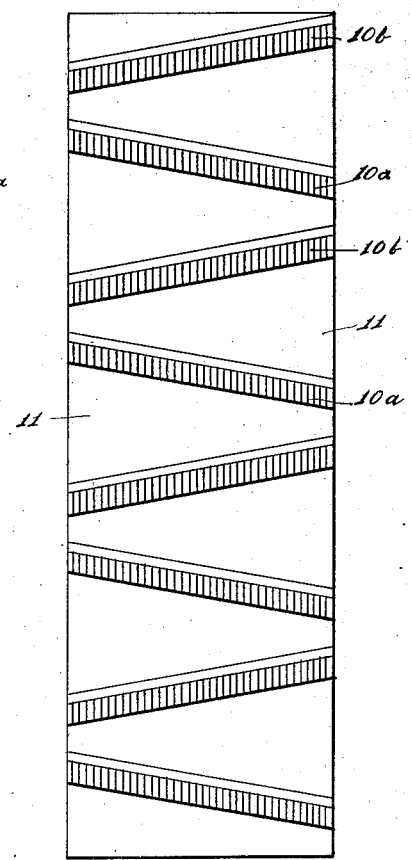
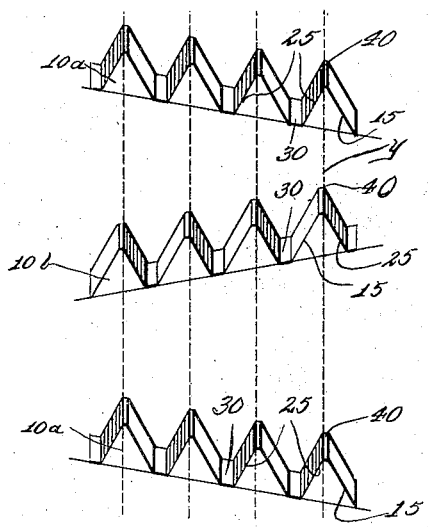
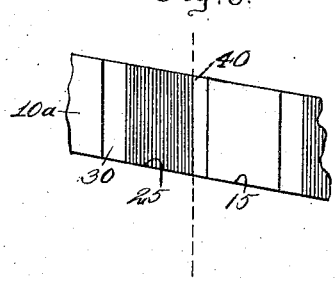
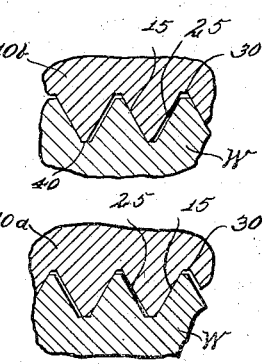
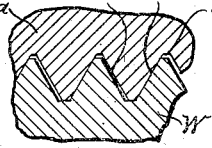
INVENTOR.
Bengt M. W. Hanson.
BY
ATTORNEY.

Patented Dec. 29, 1925.

1,567,733

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

THREAD-FORMING TOOL.

Application filed June 23, 1920. Serial No. 391,012.

*To all whom it may concern:*

Be it known that I, BENGT M. W. HANSON, a citizen of the United States, and resident of Hartford, county of Hartford, State of Connecticut, have invented certain new and useful Improvements in a Thread-Forming Tool, of which the following is a specification.

The present invention relates to a thread forming tool of the sort having teeth arranged in rows adapted to be successively brought into engagement with the work and the purpose of the invention is to provide a tool of this sort having features of novelty and advantage, and particularly wherein certain objections to previous tools are eliminated.

Generally speaking, in previous thread forming tools of this sort, the cross sectional shape and size of the teeth correspond to the thread being cut, and in operation both sides and the top of each tooth will cut a chip, which chips curl up and bind against one another so that they do not readily free themselves, the result being greater power is necessary to cut the thread and as the resistance to the tool is increased, the tool dulls quickly. Furthermore, in tools of this sort, it has been usual to arrange the rows of teeth at right angles to the direction in which the teeth move into engagement with the work and thus all of the teeth of each row strike the work at the same time, resulting in excessive strains and shocks on the work centers and tool and also in objectionable chattering. It has been proposed to similarly incline the rows of teeth at a slight angle to a line running at right angles to the direction in which the teeth move into engagement with the work so that instead of all of the teeth of each row engaging the work at the same time, the teeth of each row successively engage the work. This latter arrangement, while having certain advantages, is objectionable in that one edge of each tooth is in the form of an obtuse angle having poor cutting quality and all of these obtuse angled cutting edges cut on the same side of the thread.

In accordance with that embodiment of the present invention herein selected for the purpose of illustration, the rows of teeth are inclined at an angle to a line perpendicular to the direction in which the teeth move into engagement with the work (preferably adjacent rows being inclined in opposite directions) so that the teeth of each row are successively brought into engagement with the work without exerting undue strains on the parts or causing chattering. Furthermore, that edge of each tooth which is in the form of an obtuse angle is cut back or away so that it will not operate on the work and, therefore, only one edge of each tooth will take a chip and that cutting edge is an acute angle and will shear out a substantially straight chip which may readily free itself, all of which means that the friction and strain on the parts are reduced to a minimum, the tool is given a longer life and will cut a cleaner thread and less energy will be expended.

In the accompanying drawing:

Fig. 1 is a perspective view of a cutting tool showing one embodiment which the present invention may take.

Fig. 2 is a view showing the perimeter of the tool, illustrated in Fig. 1, straightened out.

Fig. 3 is a view on an enlarged scale showing diagrammatically the relation of the teeth of the several rows.

Fig. 4 is an enlarged view of the teeth of one row in cutting relation to the work.

Fig. 5 is a similar view showing the teeth of an adjacent row in cutting relation to the work, and Fig. 6 is a view on a greatly enlarged scale looking down on the top of one of the teeth.

In the drawings, I have illustrated my invention incorporated in a hob on the surface of which are formed rows of teeth $10^a$, $10^b$, separated by flutes 11. The numeral 15 indicates the cutting edge of each tooth; 25, the obtuse angled edge which is cut back; 30, the root, and 40, the top or cutting point.

For convenience, the hob may be considered as being constructed by forming upon the peripheral surface thereof a plurality of circular ribs corresponding in cross section to the thread to be cut, longitudinally fluting the peripheral surface as shown, and then cutting back the obtuse angled edge of each tooth. The lines *y* of Fig. 3 indicate the center lines of the circular ribs referred to, and from this figure, it will be clear that but for cutting back the obtuse angled edges of the teeth, the corresponding teeth of the several rows would be back of one another, so to speak. The rows of teeth are inclined slightly at an angle to the length of the hob, and preferably adjacent rows are oppositely inclined, that is to say, alternate rows of teeth $10^a$ are inclined in one direction and intervening rows $10^b$ in the opposite direction.

It will readily be seen that due to the inclination of the rows of teeth, the edge 15 of each tooth and which edge is nearer the forward or most advanced end of the row to which that tooth belongs, is in the form of an acute angle and will start to cut at its root, which means that it will take a shearing cut. The other edge 25 of each tooth being in the form of an obtuse angle which has poor cutting characteristics is cut back, as has been stated, so that it will not operate upon the work. It will be noted that only the acute angled edge of each tooth will take out a chip and this chip being substantially straight may readily curl up and free itself. It will further be noted, particularly from Fig. 3, that the cutting edges 15 of the teeth of adjacent rows are on opposite sides so that the teeth of one row will operate on one side of the thread being cut and the teeth of the next row will operate on the other side and so on, and thus give a uniform, well finished thread.

In forming a thread with the tool herein described, the tool, while rotating, is fed into the work $w$ (while the latter is held against rotation) until the teeth reach the proper depth. The work is then rotated and the tool and work are relatively moved longitudinally to one another a distance equal to the desired pitch of the thread to be cut.

I wish it to be clearly understood that the invention is not limited to the particular embodiment herein selected for the purpose of illustration and that the tool is susceptible of variation of modification within the scope of the invention as defined in the appended claims.

I claim as my invention:—

1. A thread forming tool having a plurality of rows of thread cutting teeth some of said rows being inclined in one direction to a line at right angles to the line of movement of the teeth, and others in the opposite direction.

2. A thread forming tool having a plurality of rows of thread cutting teeth inclined to a line at right angles to the direction of movement of the teeth, adjacent rows being oppositely inclined.

3. A thread forming tool comprising a plurality of rows of teeth, some of said rows being inclined in one direction to a line at right angles to the direction of movement of the teeth and others in the opposite direction, and the obtuse angled edge of each tooth being cut back.

4. A thread forming tool having a plurality of rows of teeth inclined to a line at right angles to the direction of movement of the teeth, adjacent rows being inclined in opposite directions and each tooth having a single side-cutting edge.

5. A thread forming tool having a plurality of rows of teeth inclined to a line at right angles to the direction of movement of the teeth, adjacent rows being inclined in opposite directions, and each tooth having an acute angled side-cutting edge, the opposite edge of each tooth being cut back.

6. A thread forming tool having a plurality of rows of teeth each provided with a single side-cutting edge, adjacent rows being oppositely inclined to a line at right angles to the direction of movement of the teeth and corresponding teeth of adjacent rows being offset one relative to the other.

BENGT M. W. HANSON.